(12) United States Patent
Nishikawa

(10) Patent No.: US 7,651,225 B2
(45) Date of Patent: Jan. 26, 2010

(54) THREE DIMENSIONAL DISPLAY SYSTEM

(75) Inventor: Osamu Nishikawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 432 days.

(21) Appl. No.: 11/750,072

(22) Filed: May 17, 2007

(65) Prior Publication Data

US 2008/0013049 A1 Jan. 17, 2008

(30) Foreign Application Priority Data

Jul. 14, 2006 (JP) ............................. 2006-194091

(51) Int. Cl.
*G03B 21/28* (2006.01)
*G03B 21/60* (2006.01)
*G02B 27/24* (2006.01)
*G02B 27/22* (2006.01)
*H04N 13/04* (2006.01)

(52) U.S. Cl. ................. 353/7; 353/6; 353/98; 359/458; 359/471; 359/479; 348/51

(58) Field of Classification Search ................. 353/6–7, 353/98; 359/458, 462, 466, 471, 479; 348/42, 348/51

See application file for complete search history.

(56) References Cited

U.S. PATENT DOCUMENTS

| | | | |
|---|---|---|---|
| 3,619,065 A | 11/1971 | Agnew et al. | |
| 3,773,404 A | 11/1973 | Moore | |
| 5,394,202 A | 2/1995 | Derring | |
| 5,945,966 A | 8/1999 | Acantilado | |
| 6,462,840 B1 | 10/2002 | Kravtsov | |
| 6,625,088 B1 | 9/2003 | Mah et al. | |
| 7,058,239 B2 | 6/2006 | Singh et al. | |
| 7,125,122 B2 | 10/2006 | Li et al. | |
| 7,168,809 B2 * | 1/2007 | Hoshino et al. ................ | 353/7 |
| 2007/0247595 A1 | 10/2007 | Refai et al. | |
| 2008/0013049 A1 | 1/2008 | Nishikawa | |

FOREIGN PATENT DOCUMENTS

| | | |
|---|---|---|
| JP | 63-113518 A | 5/1988 |
| JP | 02-178720 | 7/1990 |
| JP | 04-014086 | 1/1992 |
| JP | 5-249428 A | 9/1993 |

(Continued)

OTHER PUBLICATIONS

Tsutomu Miyasato et al., An evaluation of virtual space teleconferencing system based on detection of objects pointed through a virtual space, IEICE Transactions Japanese edition, May 1997, 1221-1230, vol. J80-D-11, No. 5, Japan.

*Primary Examiner*—Diane I Lee
*Assistant Examiner*—Magda Cruz
(74) *Attorney, Agent, or Firm*—Sughrue Mion, PLLC

(57) ABSTRACT

A three dimensional display apparatus includes a three dimensional shape reconstruction apparatus, a reflecting device, a controller and a projecting device. The three dimensional shape reconstruction apparatus reconstructs a target three dimensional shape. The reflecting device reflects projection light from above the three dimensional shape reconstruction apparatus, to side faces of the three dimensional shape reconstruction apparatus. The controller controls the three dimensional shape reconstruction apparatus based on three dimensional shape information. The projecting device projects a surface image of the top face of the target three dimensional shape onto the top face of the three dimensional shape reconstruction apparatus. The projecting device projects surface images of the side faces of the target three dimensional shape onto the side faces of the three dimensional shape reconstruction apparatus through the reflecting devices.

20 Claims, 20 Drawing Sheets

FOREIGN PATENT DOCUMENTS

| | | |
|---|---|---|
| JP | 08-205197 A | 8/1996 |
| JP | 2736908 B2 | 1/1998 |
| JP | 2000-010194 A | 1/2000 |
| JP | 3127447 B2 | 11/2000 |
| JP | 2000-352695 A | 12/2000 |
| JP | 2001-514767 T | 9/2001 |
| JP | 2002-139700 A | 5/2002 |
| JP | 2003-131319 A | 5/2003 |
| JP | 2004-004358 A | 1/2004 |
| JP | 2005-070687 A | 3/2005 |
| JP | 2005-252914 A | 9/2005 |
| JP | 2006-085135 A | 3/2006 |

* cited by examiner

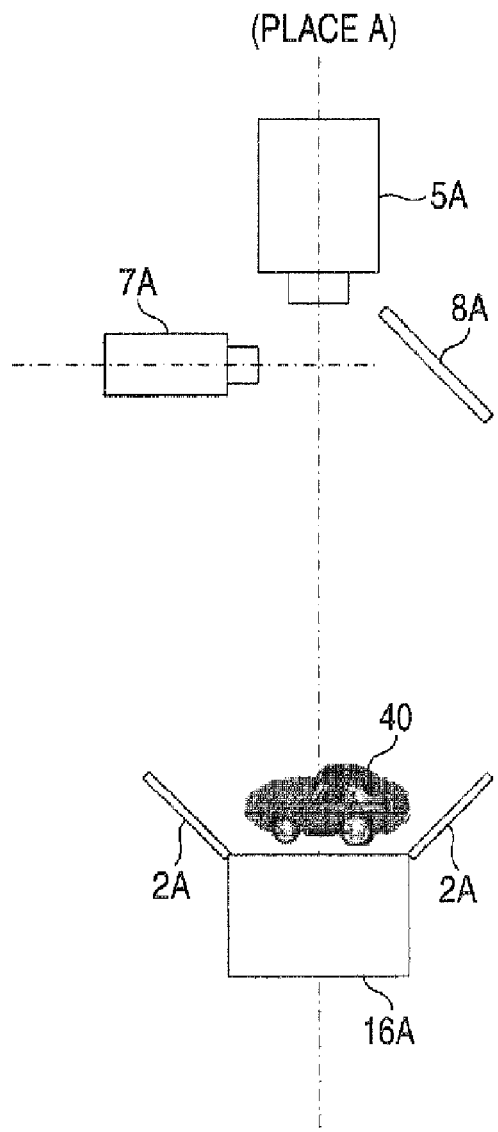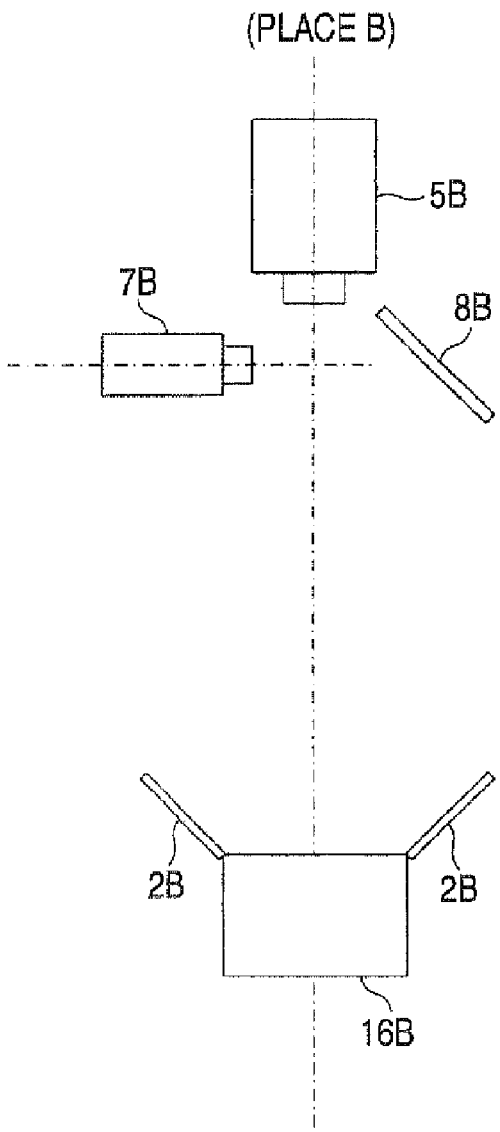

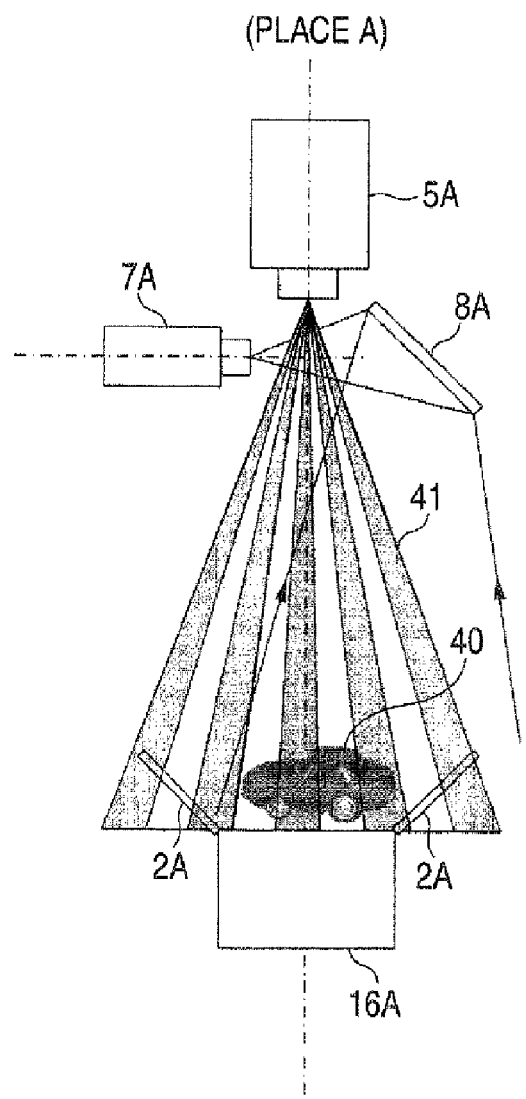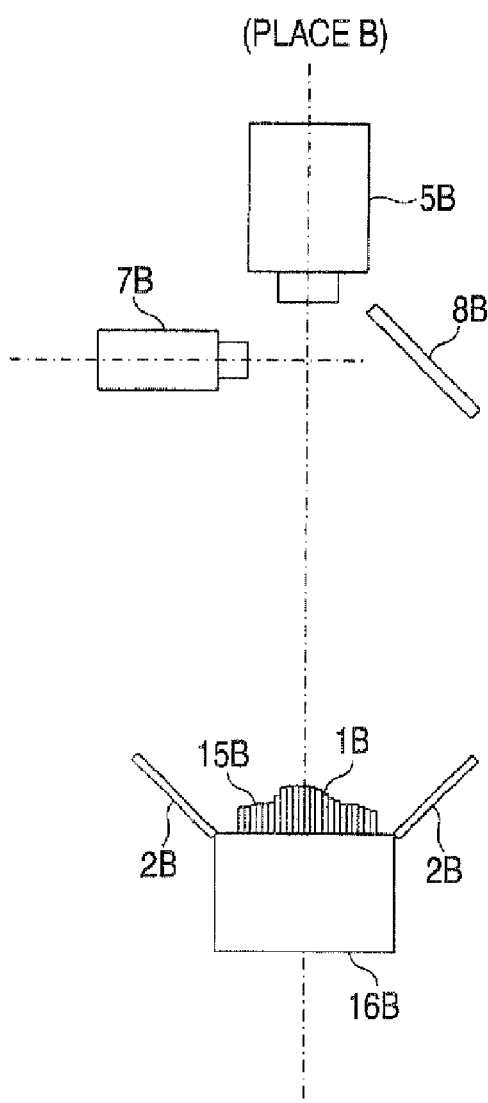

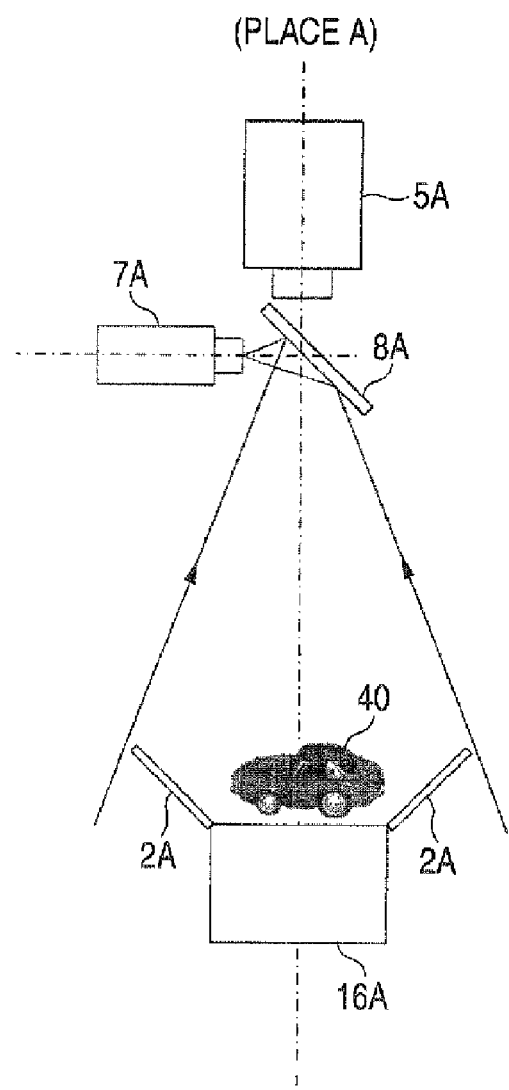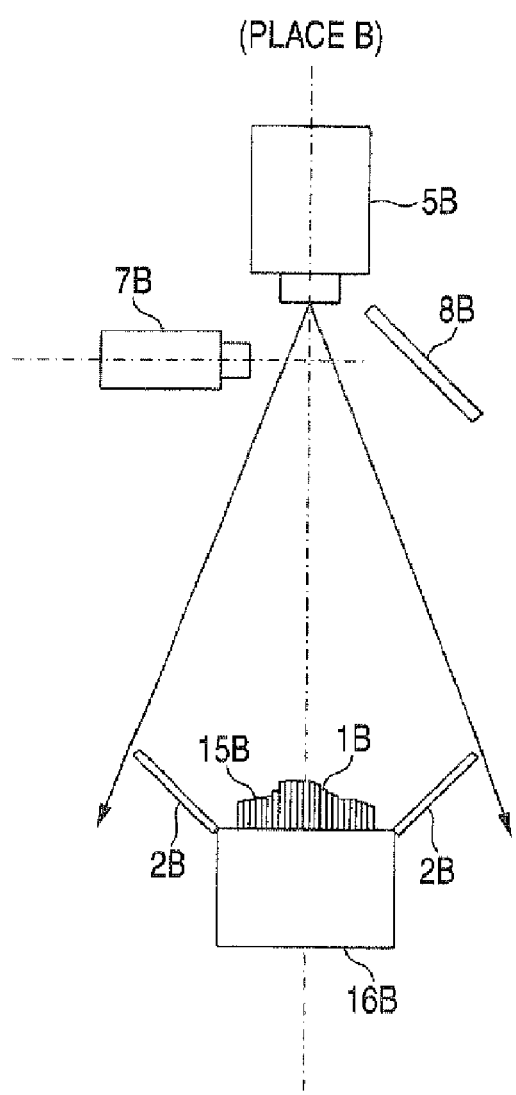
FIG. 4A (PLACE A)
FIG. 4B (PLACE B)

FIG. 6A
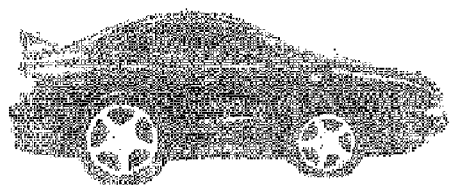
FIG. 6B    FIG. 6C    FIG. 6D
 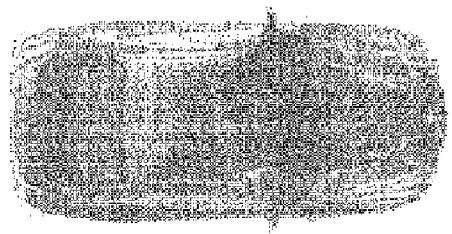 
FIG. 6E
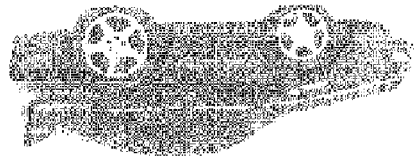

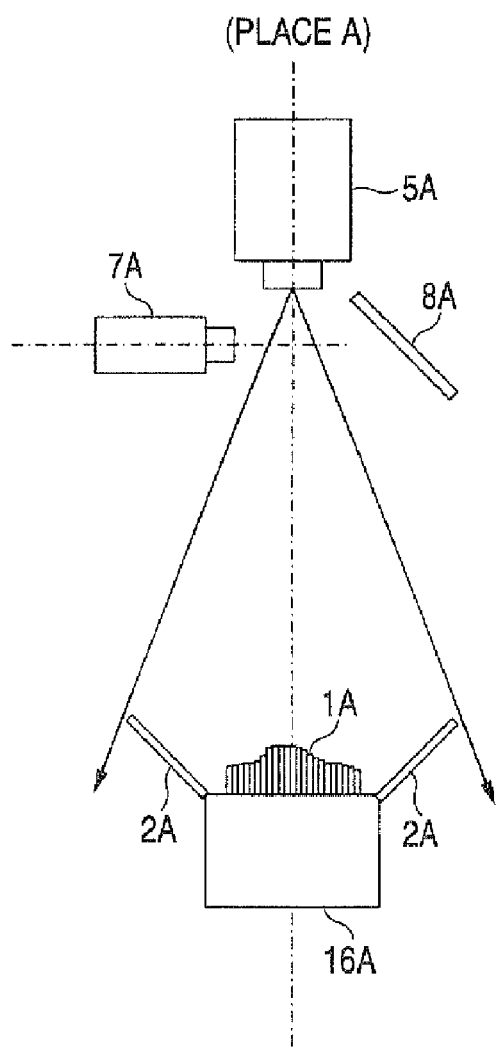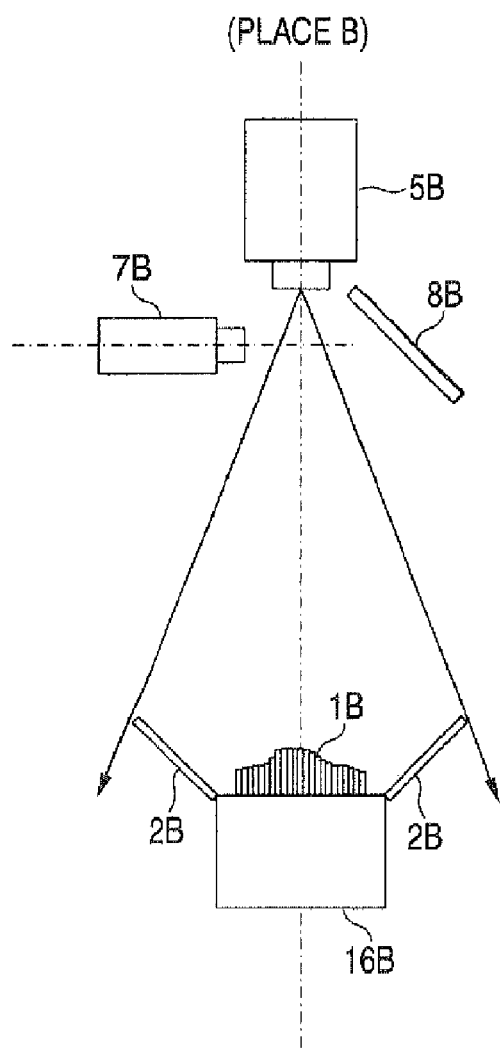

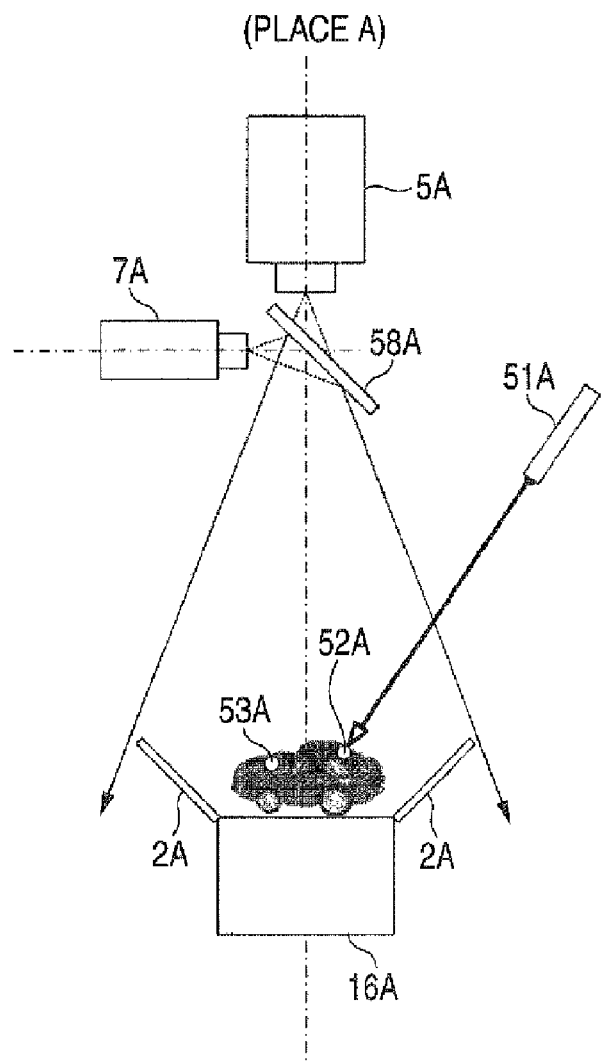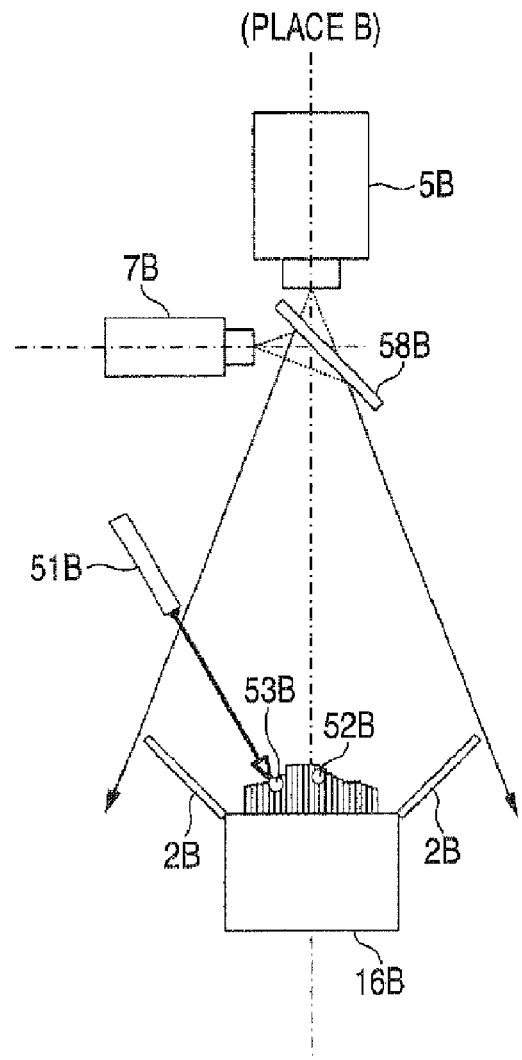

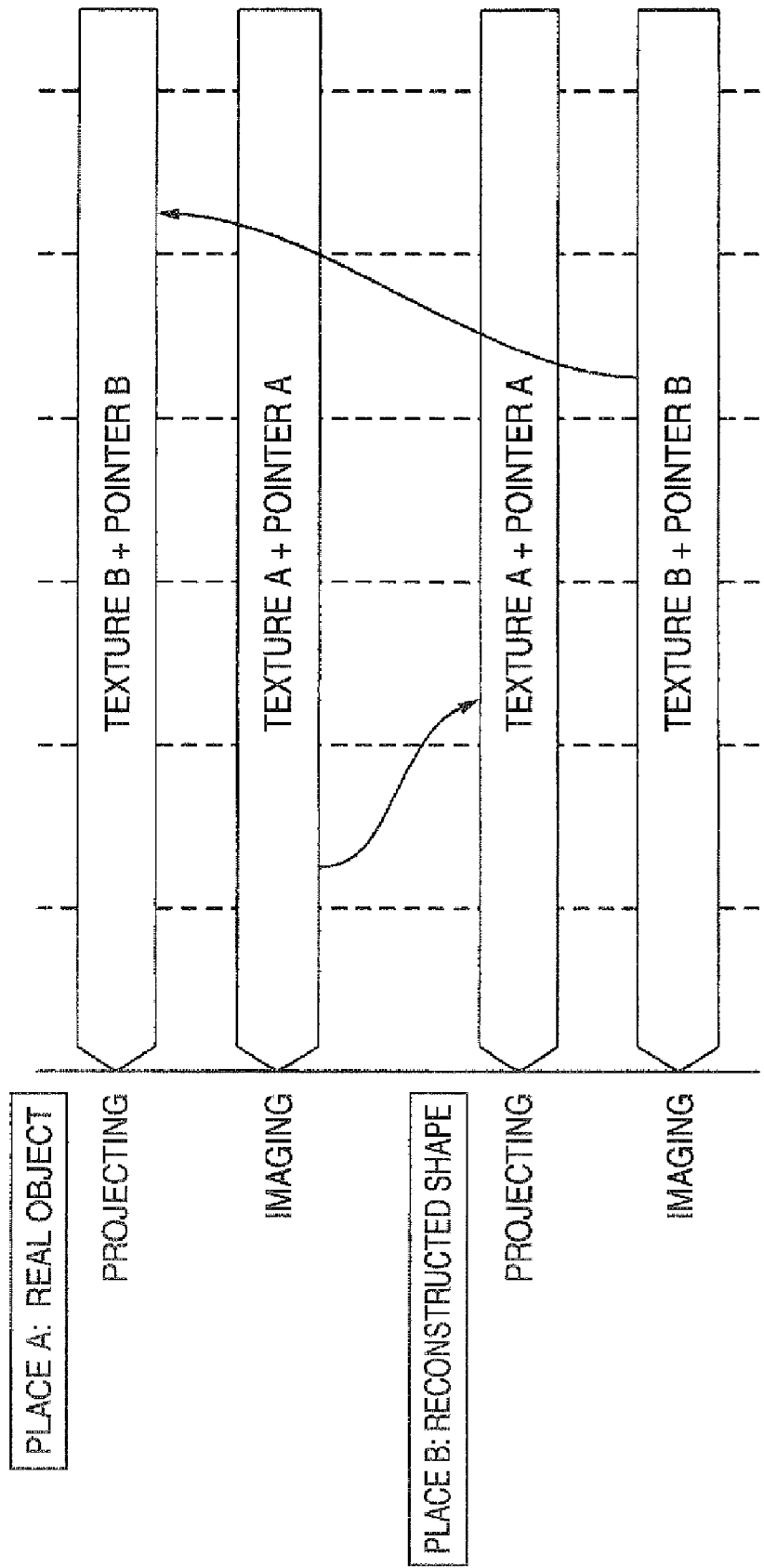

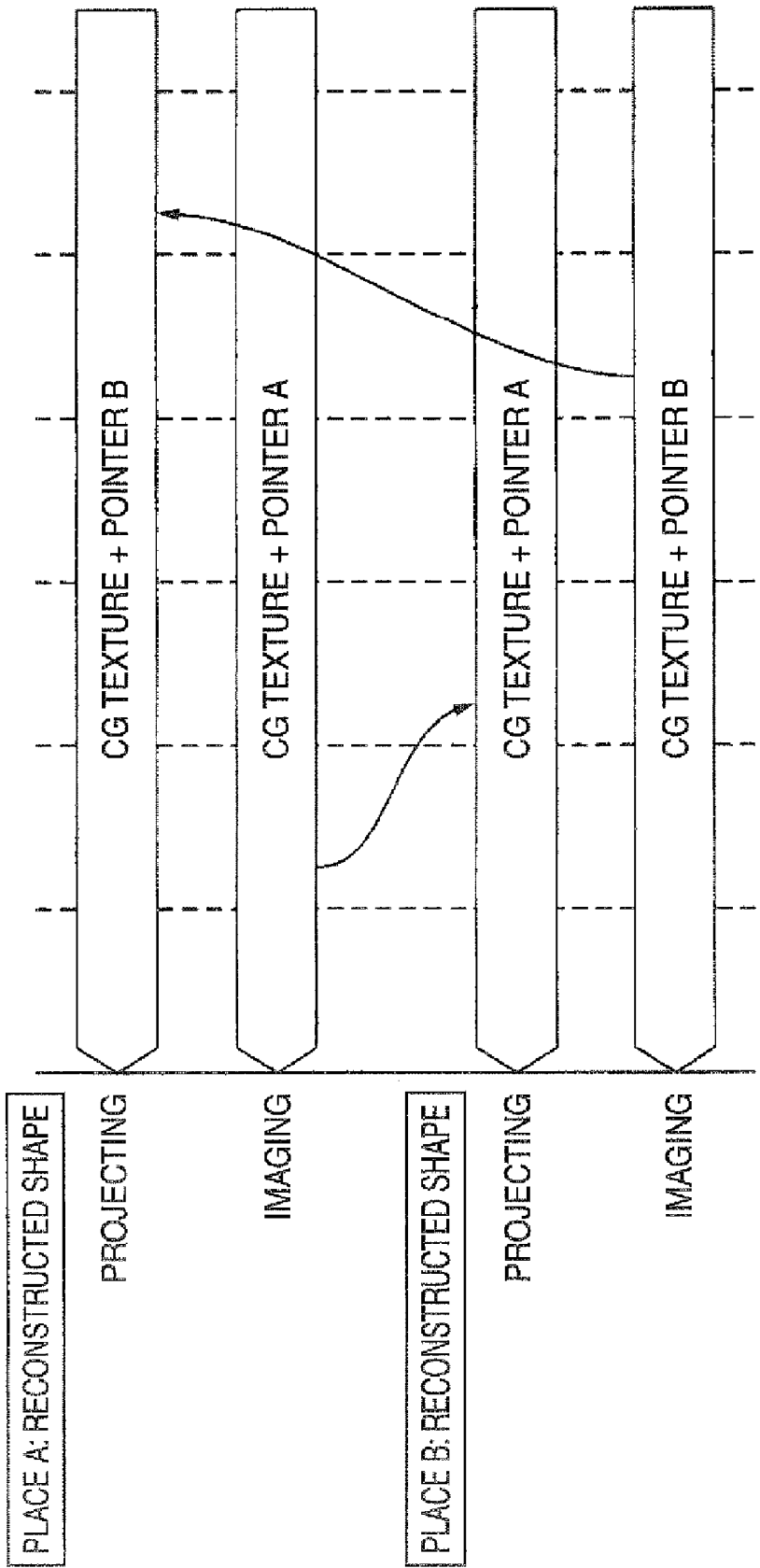

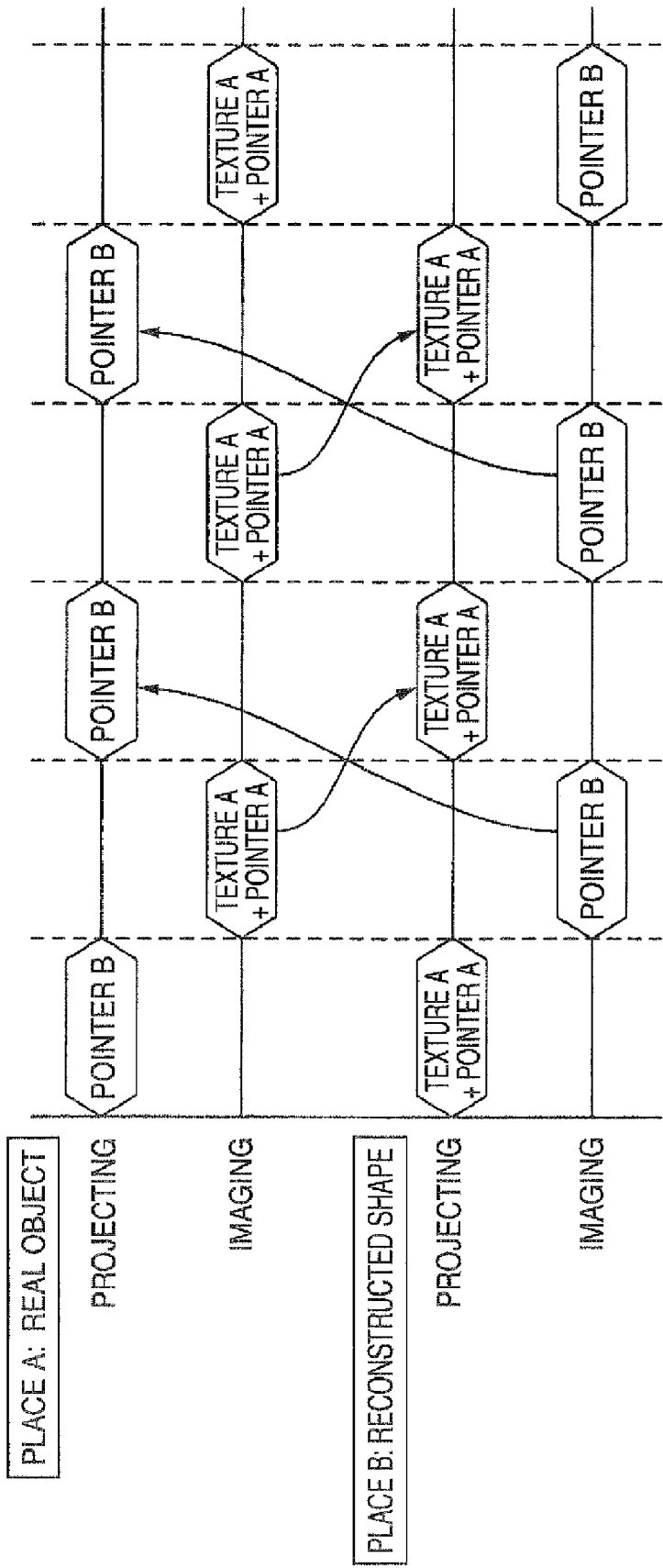

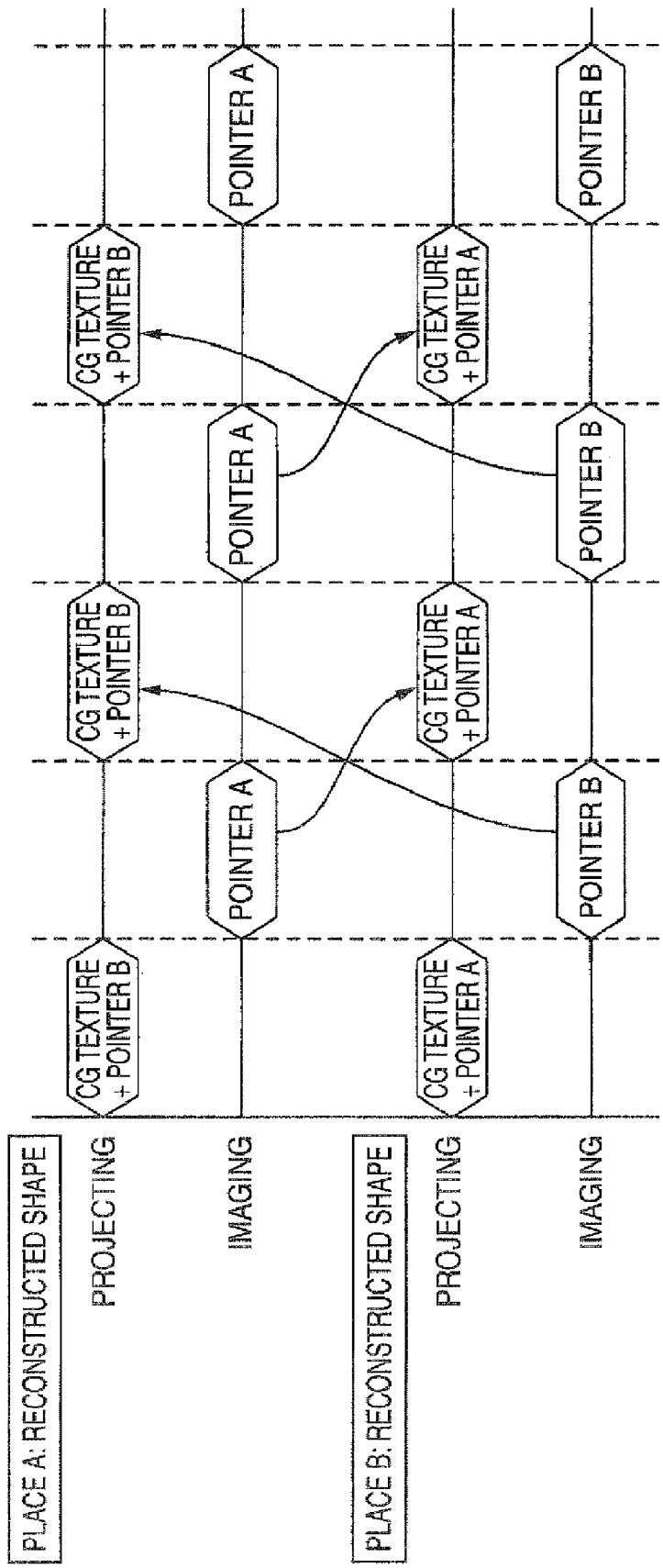

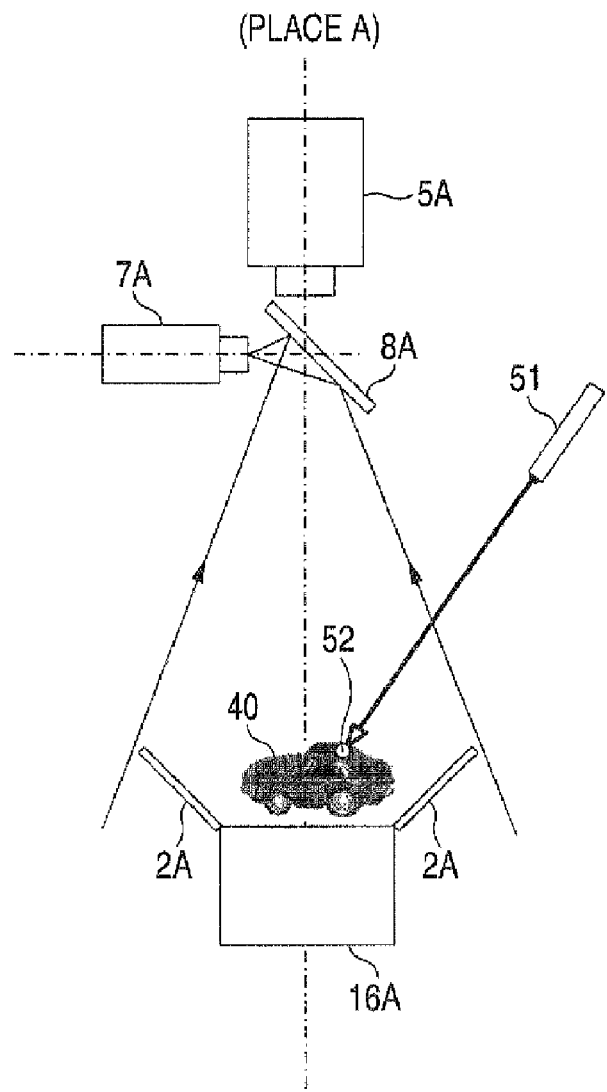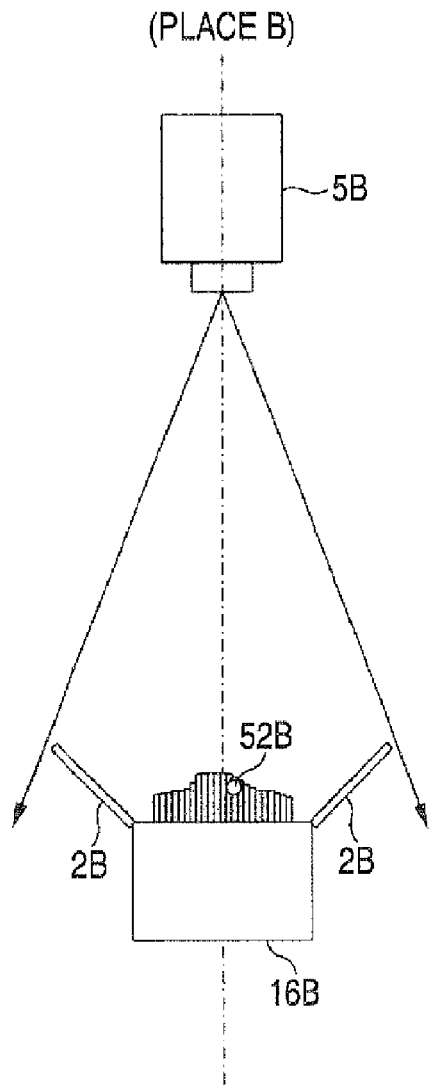
FIG. 18A (PLACE A)
FIG. 18B (PLACE B)

ved at each place and is for use in the three dimensional display system according to the exemplary embodiment of the invention;

THREE DIMENSIONAL DISPLAY SYSTEM

CROSS-REFERENCE TO RELATED APPLICATIONS

This application is based on and claims priority under 35 U.S.C. §119 from Japanese Patent Application No. 2006-194091 filed Jul. 14, 2006.

BACKGROUND

1. Technical Field

The invention relates to a three dimensional display system.

2. Related Art

When plural persons discuss one theme, a collaboration conference mode in which the persons share mutual information, intention, thought, etc., for deepening the discussion and drawing a conclusion has been used increasingly. At the time, an occasion using a three dimensional display for the purpose of presenting data in an easy-to-view and easy-to understand form grows.

Various three dimensional display technologies have been proposed up to now. Representative examples are polarized glasses and a lenticular system. In addition, a volumetric display system that is capable of producing display as if a substance existed as viewed from anywhere has also been proposed.

SUMMARY

According to an aspect of the invention, a three dimensional display system includes a first apparatus disposed at a first place and a second apparatus disposed at a second place. The first apparatus includes a first three dimensional shape reconstruction apparatus, a first reflecting device, a first controller and a first projecting device. The first three dimensional shape reconstruction apparatus reconstruct a target three dimensional shape. The first reflecting device reflects projection light from above the three dimensional shape reconstruction apparatus, to side faces of the three dimensional shape reconstruction apparatus. The first controller controls the first three dimensional shape reconstruction apparatus based on three dimensional shape information. The first projecting device projects a surface image of the top face of the target three dimensional shape onto the top face of the first three dimensional shape reconstruction apparatus and projects surface images of the side faces of the target three dimensional shape onto the side faces of the first three dimensional shape reconstruction apparatus through the first reflecting device. The second apparatus includes a second transmitter that transmits to the first apparatus the three dimensional shape information, the surface image of the top face of the target three dimensional shape and the surface images the side faces of the target three dimensional shape.

BRIEF DESCRIPTION OF THE DRAWINGS

Exemplary embodiments of the invention will be described in detail below with reference to the accompanying drawings, wherein:

FIGS. 2A and 2B are schematic drawings each to show an example of a three dimensional display that is provided at each place and is for use in the three dimensional display system according to the exemplary embodiment of the invention;

FIGS. 3A and 3B are schematic drawings each to show an example of the three dimensional display that is provide at each place And is for use in the three dimensional display system according to the exemplary embodiment of the invention;

FIGS. 4A and 4B are schematic drawings each to show an example of the three dimensional display that is provide at each place And is for use in the three dimensional display system according to the exemplary embodiment of the invention;

FIGS. 6A to 6E are drawings to show examples of imaged texture images; FIG. 6A shows a left face image, FIG. 6B shows a rear face image, FIG. 6C shows a top face image, FIG. 6D shows a front face image, and FIG. 6E shows a right face image;

FIGS. 10A and 10B are schematic drawings each to show an example of the three dimensional display that is provided at each place And is for used in the three dimensional display system according to the exemplary embodiment of the invention;

FIGS. 12A and 12B are drawings to show an example of displaying a bright point pointed to by a pointer in two ways in the three dimensional display system according to the exemplary embodiment of the invention;

FIG. 13A shows the case where a real object at a place A is reconstructed at the place B, and FIG. 13B shows the case where a 3D model on 3D-CAD is reconstructed at two points;

FIG. 14 shows an example of separating projection and imaging in a time-division manner; FIG. 14A shows the case where a real object at the place A is reconstructed at the place B and FIG. 14B shows the case where a 3D model on 3D-CAD is reconstructed at two points;

FIGS. 18A and 18B are drawings to show an example where a bright point pointed to by a laser pointer, which serves as a projecting indicator, at the place A is displayed at a corresponding position on a three dimensional shape reconstructed at the place B when a real object exists at the place A and the shape reconstructed by the shape reconstruction apparatus exists at the place B.

DETAILED DESCRIPTION

Referring now to the accompanying drawings, exemplary embodiments of the invention will be described.

Figure 7:
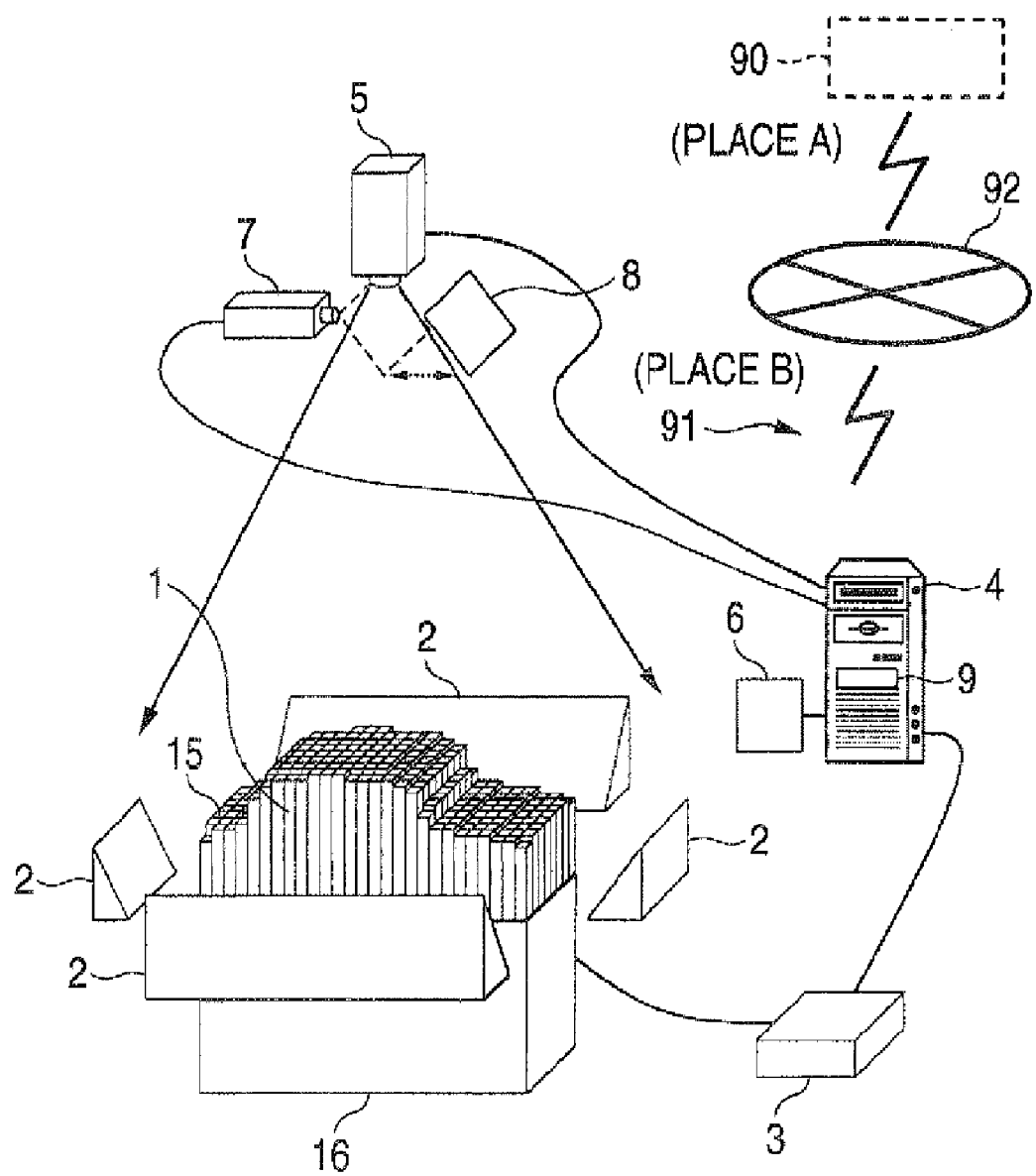
FIG. 7 is a drawing to show the three dimensional display system according to an exemplary embodiment of the invention.

FIG. 7 is a drawing to show a three dimensional display system according to an exemplary embodiment of the invention. The system has an apparatus 90 placed at a place A and an apparatus 91 placed at a place B, which are connected through a network 92, as shown in FIG. 7. It is not necessary that the places A and B are remote locations and may be adjacent to each other. If the places A and B are remote locations, the system may be used as a remote meeting system. The mode of the network 92 is not limited and may be, for example, a public network or a leased line network. The apparatus 90 placed at the place A may be configured like the apparatus 91 placed at the place B, which will be described later. In the exemplary embodiment, three dimensional shape information and a surface image of the top face of a target three dimensional shape and surface images of the side faces of the target three dimensional shape are transmitted from the apparatus 90 to the apparatus 91 as described later.

The apparatus 91 placed at the place B includes: a three dimensional shape reconstruction apparatus 1 (hereinafter, may be simply referred to as a "shape reconstruction apparatus") that has a controllable three dimensional shape and reconstructs a target three dimensional shape; side face projection mirrors 2 serving as reflecting devices that reflect projection light from above the shape reconstruction apparatus 1, to the side faces of the shape reconstruction apparatus 1; a control computer 4 serving as a controller that controls the shape reconstruction apparatus 1 through a shape reconstruction driving apparatus 3 based on received three dimensional shape information (three dimensional shape data); and a projector 5 serving as a projecting device that projects a texture image as a surface image of the top face of the received target three dimensional shape onto the top face of the reconstructed three dimensional shape and that projects texture images as surface images of the side faces of the received target three dimensional shape onto the side faces of the reconstructed three dimensional shape through the side face projection mirrors 2. The projector 5 is connected to the control computer 4. For examples the control computer 4 may be implemented as a computer such as a personal computer (PC). An input unit 6 such as a mouse and/or a joy stick may be connected to the control computer 4 to provide good operability.

The apparatus 91 includes a camera 7 serving as an imaging device that images the top face of the shape reconstruction apparatus 1 and the side faces of the shape reconstruction apparatus 1 through the side face projection mirrors 2, and an imaging mirror 8 that makes the optical axes of the projector 5 and the camera 7 be substantially identical to each other and makes the angle of views of the projector 5 and the camera 7 be substantially identical to each other. The camera 7 is connected to the control computer 4. The imaging mirror 8 is movable as indicated by the bidirectional arrow in FIG. 7. Further, the apparatus 91 may include a transmitter 9 that transmits the texture images of the top face and side faces of the three dimensional shape imaged by the camera 7 to the apparatus 90 placed at the place A. In the exemplary embodiment, the transmitter 9 is built in the control computer 4, but may also be provided separately from the control computer 4.

The shape reconstruction apparatus 1 has the controllable three dimensional shape. In an example of the exemplary embodiment, the shape reconstruction apparatus 1 employs a pin matrix system. In the pin matrix system, a large number of shape variable elements such as pins (square rods) 15 are arranged in a matrix manner on a stage 16 and the height of each pin is controlled to thereby reconstruct a shape. The pin matrix is well known as described in Japanese Patent No. 2736908, for example. In the exemplary embodiment of the invention, it is not necessary that the shape reconstruction apparatus 1 reconstructs a precise three dimensional shape. Precision in a range of 2% to 3% of the whole scale would be sufficient. For example, to three-dimensionally display a mechanical component having a size of 100 mm, a pin having a 2 to 3 mm per side in section area may be used. The pin 15 may be made of a material for diffuse reflection of light, because if the pin 15 is made of a transparent material or a mirror surface material, a texture image projected from the projector 5 is passed through or is extremely reflected and it may be difficult to give a sufficient surface texture to the three dimensional shape reconstructed by the shape reconstruction apparatus 1.

To use the shape reconstruction apparatus 1 of the pin matrix system as in the exemplary embodiment, the shape reconstruction driving apparatus 3 that drives the pins 15 arranged in the matrix manner is provided. The shape reconstruction driving apparatus 3 is connected between the shape reconstruction apparatus 1 and the control computer 4. The shape reconstruction deriving apparatus 3 obtains three dimensional shape information from the control computer 4 and drives the pins 15 of the shape construction apparatus 1 upward and downward based on this data (e.g., the received three dimensional shape information) to form (reconstruct) a three dimensional shape. The three dimensional shape information and the texture images of the top face and the side faces of a target three dimensional shape are, for example, sent from the apparatus 90 placed at the place A through the network 92 to the control computer 4 of the apparatus 91 placed at the place B.

Figure 1:
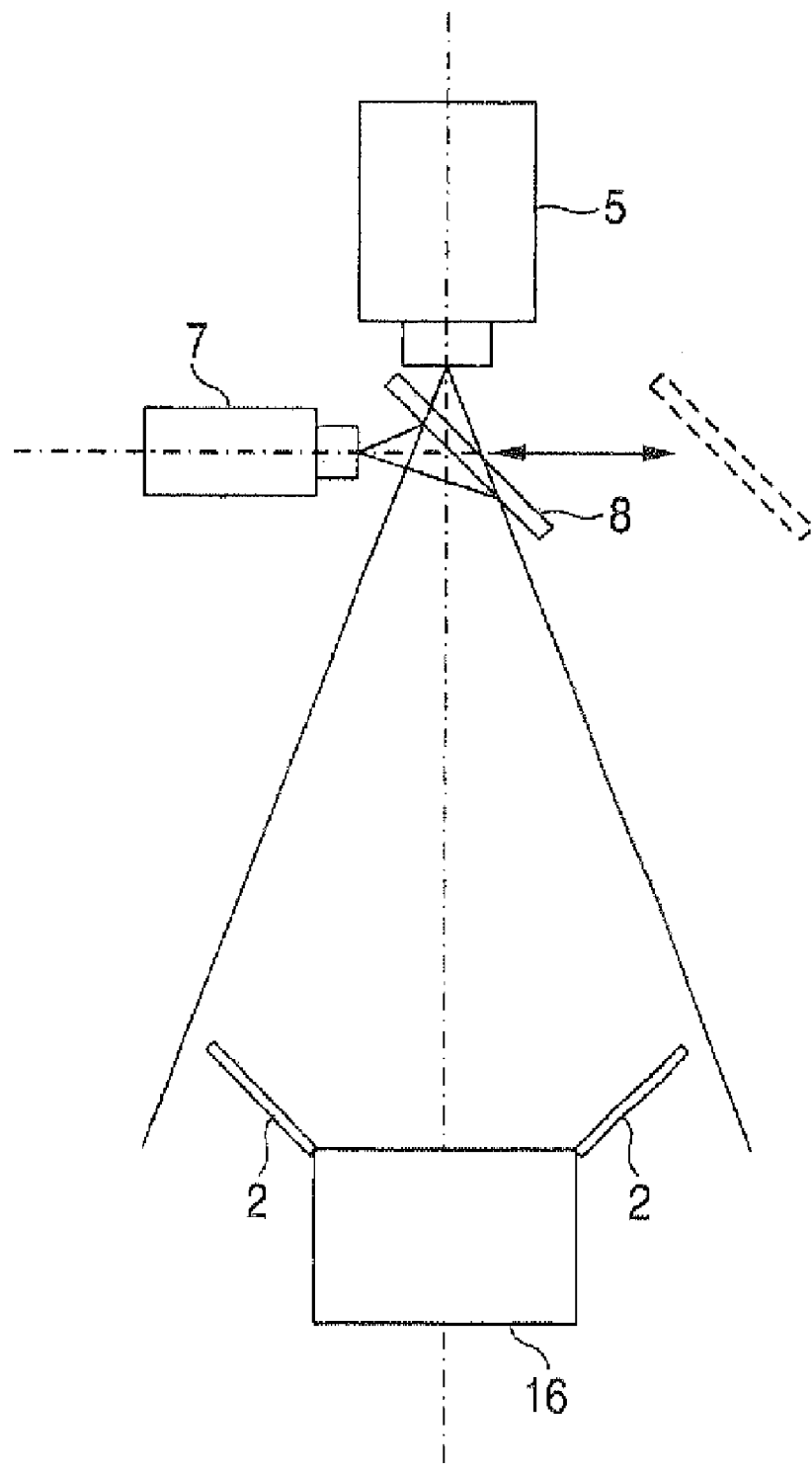
FIG. 1 is a schematic drawing to show an example of a three dimensional display for use in a three dimensional display system according to an exemplary embodiment of the invention.
Figure 5A:
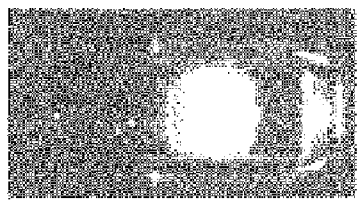
FIGS. 5A to 5F are drawings each to show an example of a real object onto which a stripe-like light and dark pattern is projected.
Figure 5B:
Figure 5C:
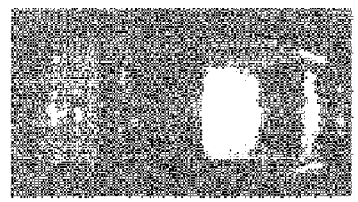
Figure 5D:
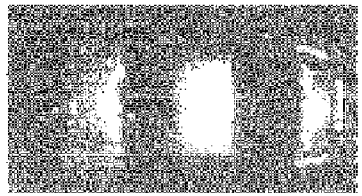
Figure 5E:
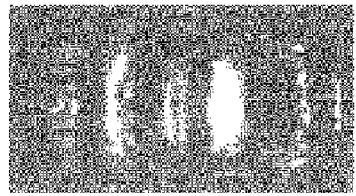
Figure 5F:
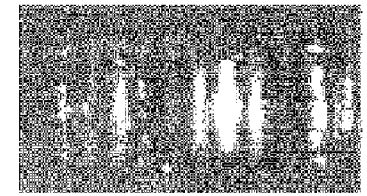

The camera 7 and the projector 5 use lenses designed so that the imaging range and the projection range match each other on a plane placed at an equal distance from the principal points of the respective lens, namely, the view angles match each other on the plane placed at the equal distance from the principal points of the respective lens. The projector 5 is placed so that its optical axis becomes perpendicular to the top face of the stage 16 and that the projection range covers the four side face projection mirrors 2. To acquire a texture image of a real object, the imaging mirror 8 is moved to the front of a lens (not shown) of the projector 5 so that the principal point position of the camera 7 matches the principal point position of the projector 5, and a real object (not shown) placed on the stage 16 is imaged with the camera 7 through the imaging mirror 8, as shown in FIG. 1. On the other hand, to acquire three dimensional shape information of a real object, the imaging mirror 8 is moved to the dashed line position in FIG. 1 out of the front of the lens of the projector 5, and a shape measuring pattern is projected onto the real object (not shown) on the stage 16 from the projector 5 and is imaged with the camera 7 through the imaging mirror 8. To project a texture image from the projector 5 onto a three dimensional shape (not show) reconstructed by the shape reconstruction apparatus 1, the imaging mirror 8 is moved to the dashed line position in FIG. 1 out of the front of the lens of the projector 5, and the texture image is projected from the projector 5 onto the reconstructed three dimensional shape on the stage 16. Thus, the imaging mirror 8 is used to make the optical axes of the imaging device and the projecting device be identical to each other and to make the view angles of the imaging device and the projecting device be identical to each other. In FIG. 1, the involved control computer, shape reconstruction drive, wiring, and the like are not shown. This also applies to FIG. 4, etc.

Figure 16:
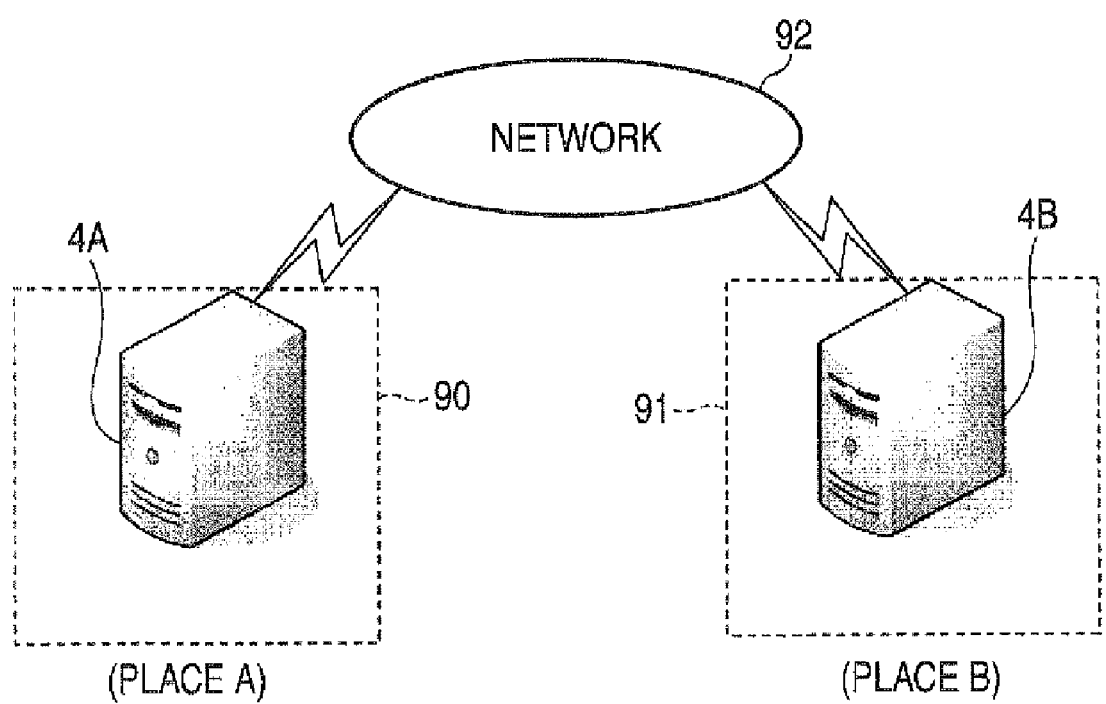
FIG. 16 is a drawing to describe a connection relationship between the places A and B in the three-dimensional display system according to the exemplary embodiment of the invention.

In this system, the apparatus 90 placed at the place A and the apparatus 91 placed at the place B are connected through the network 92, for example, as shown in FIG. 16. A control computer 4A may process texture images and three dimensional shape information of an object acquired at the place A and transmit the processing result through the network 92 to a control computer 4B at the place B. Likewise, the control computer 4B may process texture images and three dimensional shape information of an object acquired at the place B and transmit the processing result through the network 92 to the control computer 4B at the place A. In FIG. 16, other components of the apparatus 90 and 91 are not shown.

Figure 8:
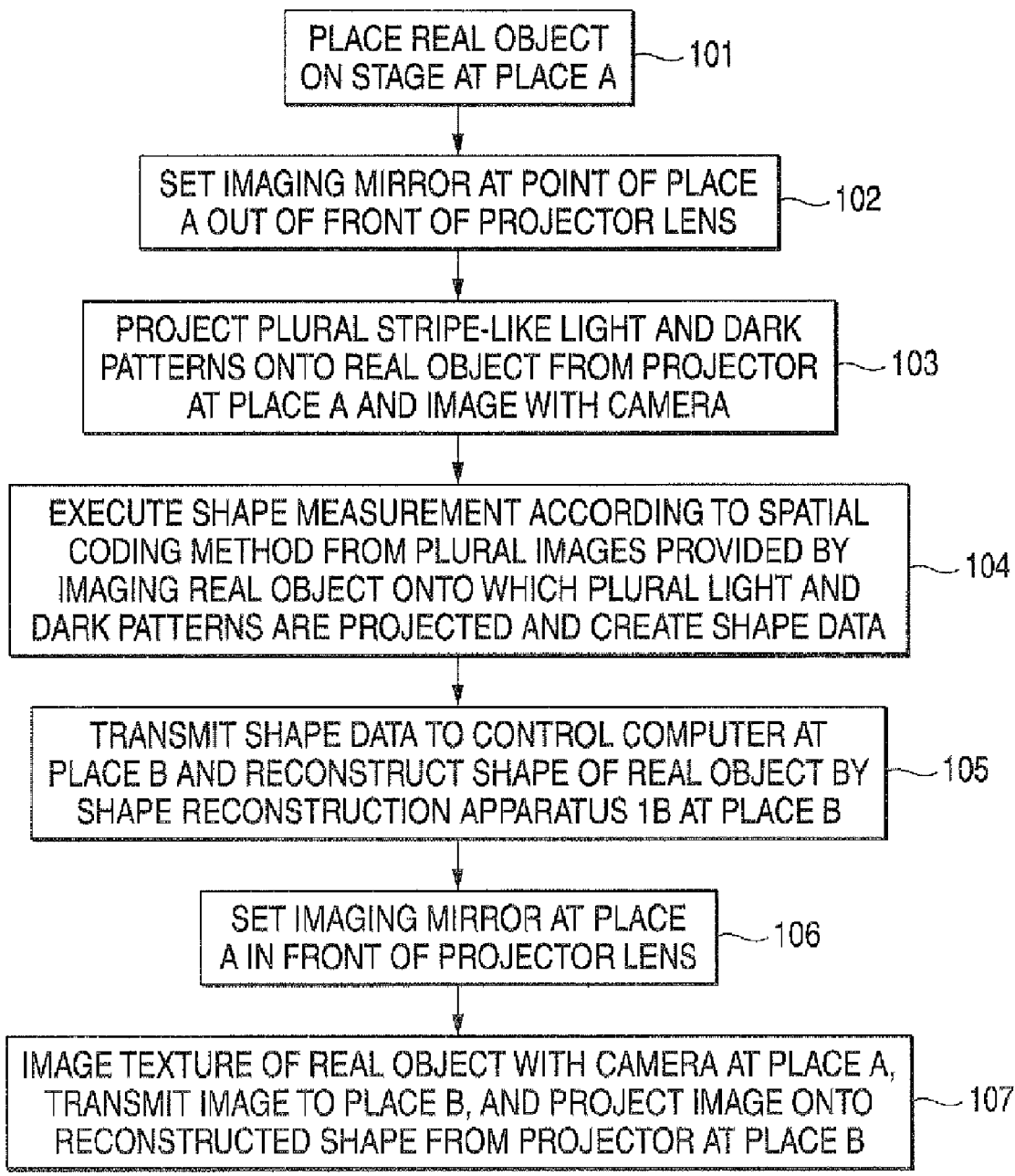
FIG. 8 is a flowchart to show the operation of the three dimensional display system according to the exemplary embodiment of the invention.
Figure 9A:
FIGS. 9A to 9F are drawings to show examples of stripe-like light and dark patterns projected from a projector.
Figure 9B:
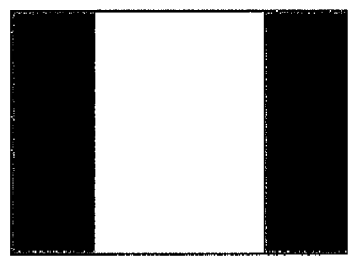
Figure 9C:
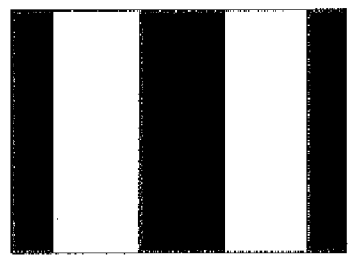
Figure 9D:
Figure 9E:
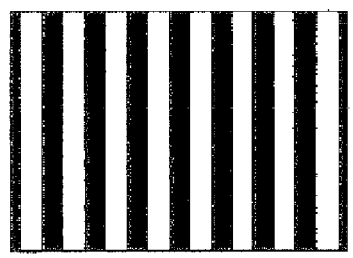
Figure 9F:
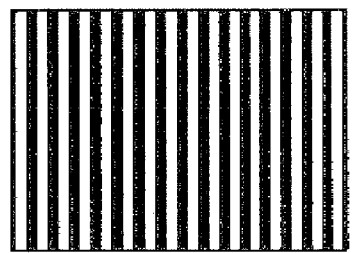

Next, the operation of the three dimensional display system according to the exemplary embodiment of the invention will be described. In the exemplary embodiment, it is assumed that a real object exists at the place A. FIG. 8 is a flowchart to show the operation of this system. FIGS. 2 to 4 are drawings to show a state at each step in the flowchart of FIG. 8. In FIGS. 2 to 4, projectors 5A and 5B, cameras 7A and 7B, stages 16A and 16B, side face projection mirrors 2A and 2B, and imaging mirrors 8A and 8B are provided so that their relative positions at the places A and B match each other. In so doing, a target three dimensional shape is reproduced at a position, at the place B, corresponding to a position where the real object is placed at the place A, and the texture images of the top face and side faces of the real object imaged with the camera are projected onto the corresponding positions of the reconstructed three dimensional shape, as specifically described below.

As shown in FIG. 2A, a real object 40 is placed on the stage 16 at the place A (step 101 in FIG. 8), and the imaging mirror 8A at the place A is set at a point out of the front of the lens of the projector 5A as shown FIG. 2A (step 102). As shown in FIG. 2B, at this time, a three dimensional shape does not yet appear on the stage 16B at the place B.

Next, as shown in FIG. 3A, a stripe-like light and dark pattern 41 is projected from the projector 5A onto the real object plural times, and an image through the imaging mirror 8A is imaged with the camera 7A (step 103). The projected stripe-like light and dark pattern 41 is, for example, as shown in FIGS. 9A to 9F, and may be gray code or may be color code. The imaged image may be in a state where the stripe-like light and dark pattern is distorted due to the shape of the real object 40 (difference of elevation), as shown in FIGS. 5A to 5F. The distortion is calculated, to thereby calculate depth information (three dimensional shape information) of each stripe edge.

Figure 15:
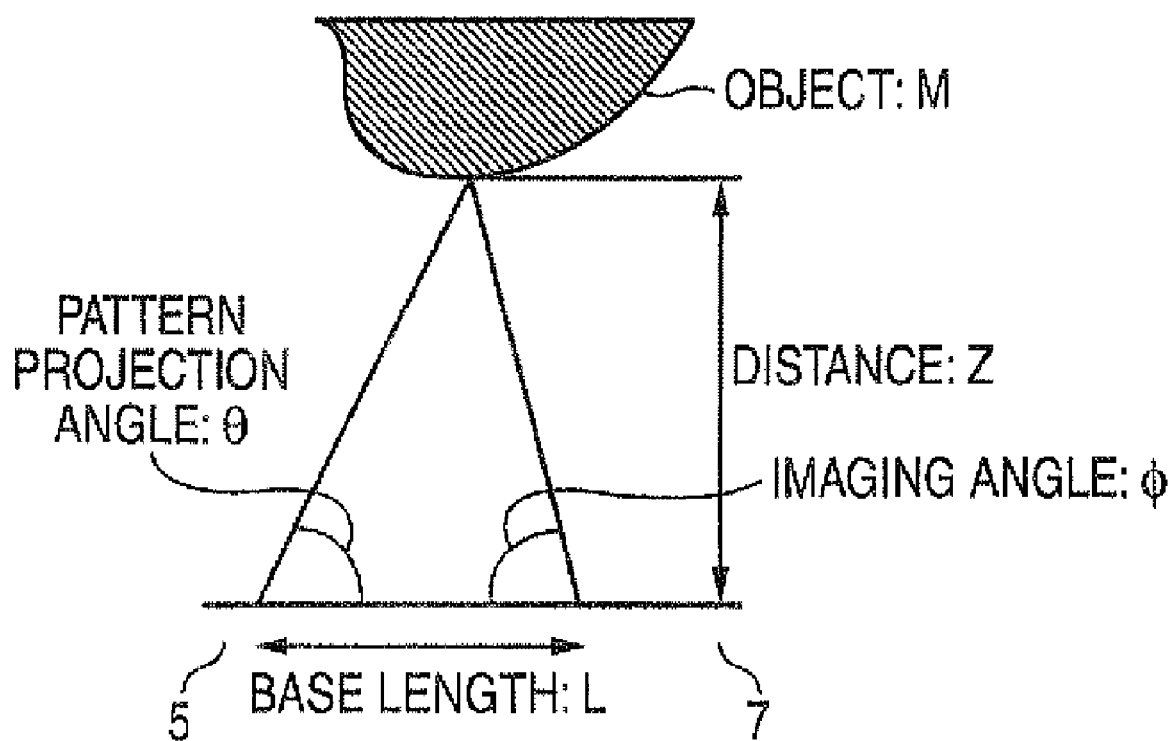
FIG. 15 is a drawing to describe an example of shape measurement by a spatial coding method.

This shape measuring system is a well-known method as "spatial coding method." As shown in FIG. 15, it is assumed that the projection angle of a light and dark pattern projected onto an object M from the projector 5 is θ, the imaging angle of the light and dark pattern imaged with the camera 7 is φ, and a lens-to-lens distance (reference length) between the projector 5 and the camera 7 is L. A distance Z to the material M is represented as follows:

$$Z = L \cdot \frac{(\tan\theta \cdot \tan\varphi)}{(\tan\theta + \tan\varphi)}$$

This distance Z is found repeatedly to thereby acquire three dimensional shape information of the material M. Thus, shape measurement is executed by the spatial coding method from plural images provided by imaging the real object onto which plural light and dark patterns are projected, and three dimensional shape information is created (step 104).

It is not necessary that the method of measuring the shape of a real object is limited to the spatial coding method. For example, any method such as a Time of Flight method or a stereo method may be adopted. Also, it is not necessary that a density of the shape measurement points is higher than that of the pins 15 of the shape reconstruction apparatus 1 arranged in the matrix manner. For example, in the case where 3-mm pitch pins are used in the shape reconstruction apparatus 1, it would be sufficient to conduct shape measurement at the 3-mm pitch density. The calculated three dimensional shape information is transmitted from the place A to the control computer 4B at the place B, which then calculates a projection amount of each pin 15B of the shape reconstruction apparatus 1B at the place B. The control computer 4B at the place B drives the shape reconstruction driving apparatus 3 to project the pins 15B arranged of the shape reconstruction apparatus 11 arranged in the matrix form as shown in FIG. 3B to reconstruct the shape of the real object 40 at the place B with the shape reconstruction apparatus 1B placed at the place B, as a corresponding three dimensional shape (step 105).

Next, as shown in FIG. 4A, the imaging mirror 8A at the place A is set in front of the lens of the projector 5A (step 106). The real object 40 is imaged with the camera 7A from the same position as the lens center of the projector 5A. At this time, not only the top face of the real object 40, but also the side face texture images of the real object 40 reflected in the side face projection mirrors 2A are imaged. FIGS. 6A to 6E are drawings to show examples of the imaged texture images; FIG. 6A shows a left face image, FIG. 6B shows a rear face image, FIG. 6C shows a top face image, FIG. 6D shows a front face image, and FIG. 6E shows a right face image. The imaged texture images of the top face and side faces of the real object 40 are transmitted to the place B and are projected from the projector 5B onto the reconstructed three dimensional shape by the control computer (not shown) as shown in FIG. 4B (step 107). Since the side face projection mirrors 2A and 2B are set in the same state at the places A and B, the side face texture images applied to the side face projection mirrors 2B are precisely projected onto the corresponding positions of the reconstructed three dimensional shape.

The case where the real object exists at the place A has been described. Even if a real object exists at neither of the places A nor B, three-dimensional (3D) information can be shared. In the following description, the case where object information previously created with 3D-CAD, etc., (which will be hereinafter referred to as "3D modeling data") exists only at the place A will be described as an example.

Figure 11:
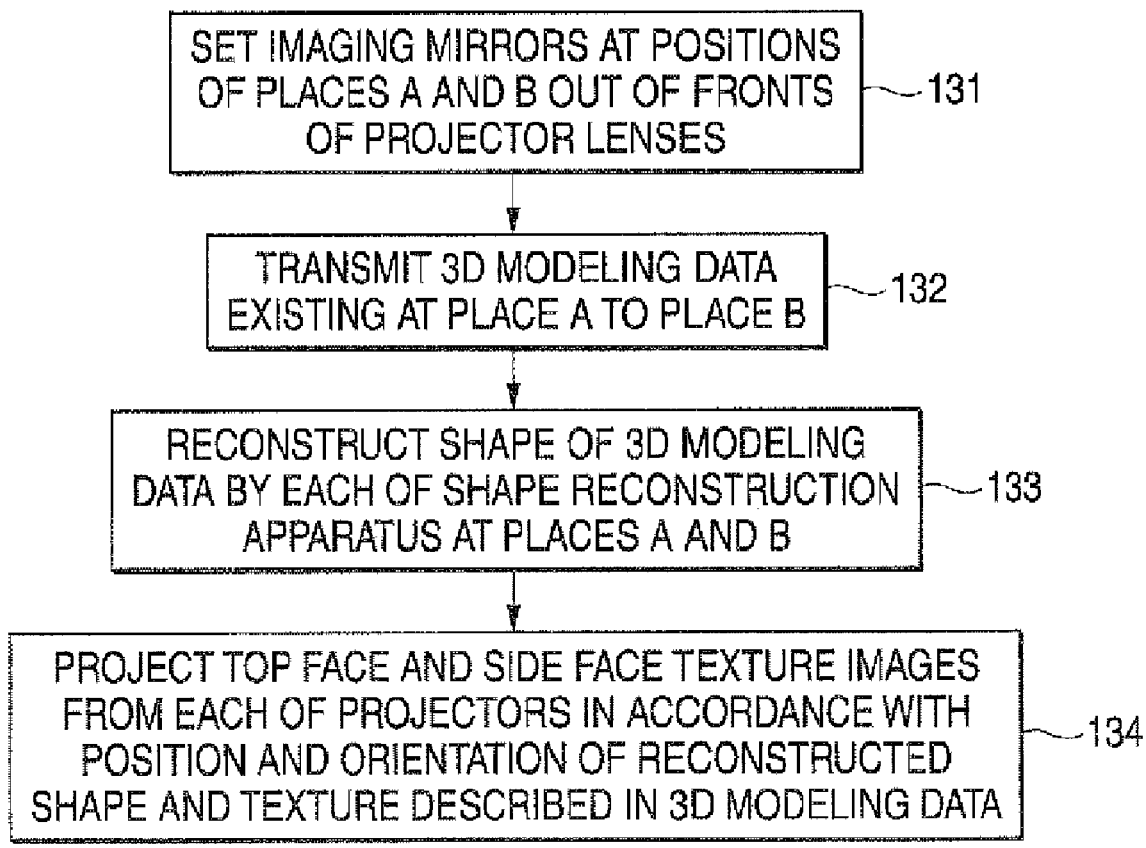
FIG. 11 is a flowchart to show the operation of the three dimensional display system in FIG. 10.

FIG. 10 is a drawing to show the case where 3D modeling data exists at the place A. FIG. 10A shows the apparatus at the place A and FIG. 10B shows the apparatus at the place B. FIG. 11 is a flowchart to describe the operation thereof. First, as shown in FIGS. 10A and 10B, the imaging mirrors 8A and 8B at the places A and B are set at positions out of the lenses of the projectors 5A and 5B (step 131 in FIG. 11). Three dimensional shape information and top face and side face texture images to reconstruct a target three dimensional shape are calculated from attitude to be displayed and a scaling factor used in the displaying based on the 3D modeling data existing at the place A and are transmitted to the place B (step 132). The 3D modeling data is stored in the control computer 4A at the place A, for example.

Next, a target three dimensional shape is reconstructed by each of the shape reconstruction apparatus 1A and 1B at the places A and B based on the three dimensional shape information (step 133). The top face and side face texture images are projected from each of the projectors 5A and 5B onto the reconstructed three dimensional shape in accordance with the position of the reconstructed three dimensional shape and the orientation of the reconstructed three dimensional shape (step 134). In so doing, the 3D modeling data created with 3D-CAD, etc., can be three dimensionally displayed at plural places where no real object exists, and the three-dimensional information can be shared among the plural places.

The image projected onto the reconstructed three dimensional shape is not limited to the texture image of a real object. For example, a result image of computer simulation, such as thermal analysis, deformation analysis or hydrodynamic analysis, of a 3D-modeled virtual object may be projected and simulation information may be shared among the plural places.

Figure 17:
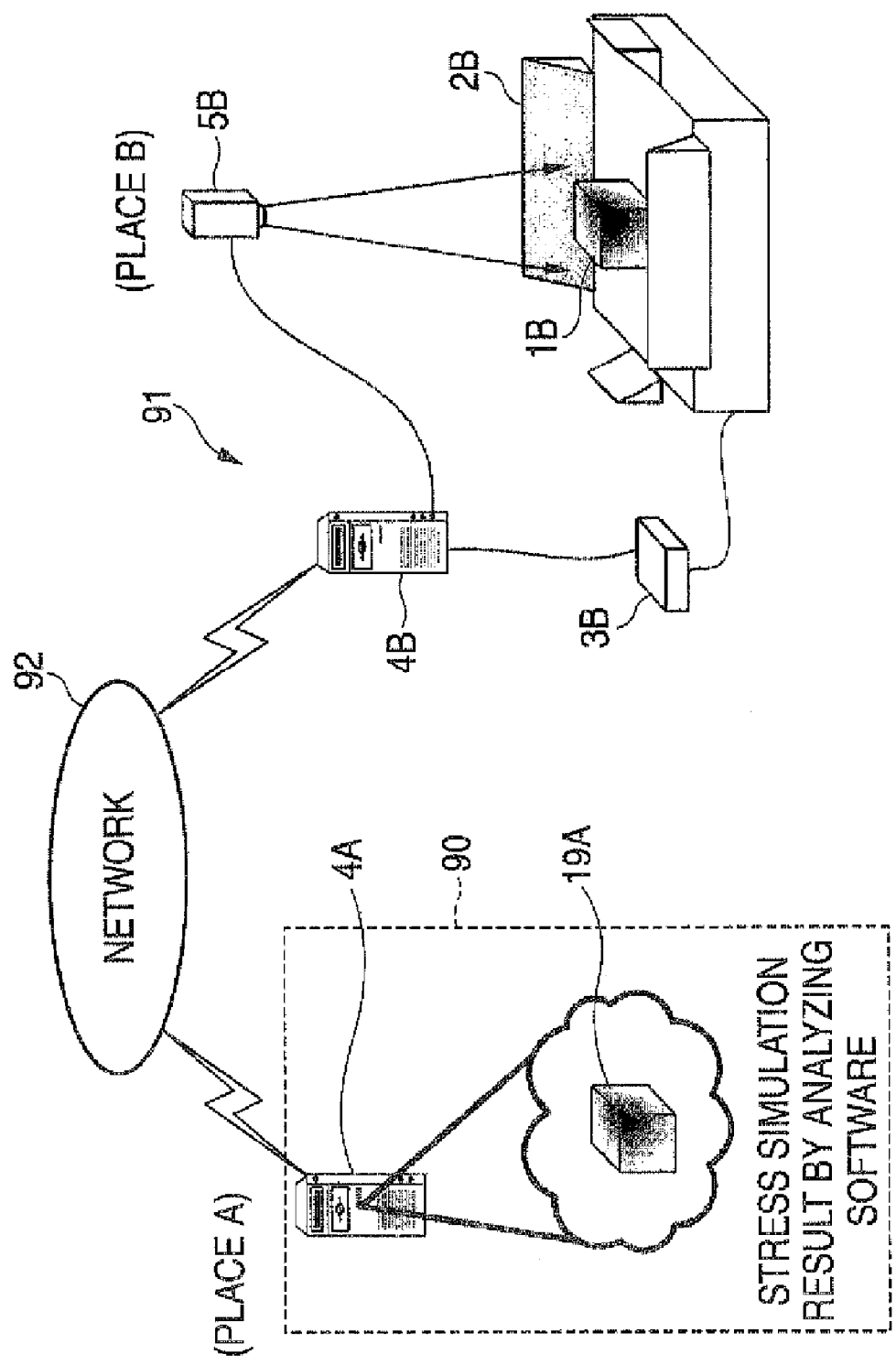
FIG. 17 is a drawing to show an example of presenting a result of a stress simulation executed by a computer to a distant place.

FIG. 17 is a drawing to show an example of presenting a result of stress simulation executed by a computer to a distant place. Using dynamic analysis software, surface stress simulation is executed for a 3D-modeled object 19A by the control computer 4A of the apparatus 90 at the place A. Three dimensional shape information of the object 19A and surface texture images which is based on the surface stress simulation result are transmitted to the control computer 4B of the apparatus 91 at the place B. The texture images are top face and side face texture images of the object 19A containing a simulation result image. At the place B, first the shape of the object 19A is reconstructed by the shape reconstruction apparatus 1B and then the surface texture image based on the stress simulation result is projected from the projector 5B. Accordingly, a stress distribution, etc., of the object 19A can be three dimensionally recognized at the distant place B.

FIGS. 18A and 18B are drawings to show an example where a bright point pointed to by a laser pointer, which serves as a projecting indicator, at the place A is displayed at a corresponding position on a three dimensional shape reconstructed at the place B when a real object exists at the place A and the shape reconstructed by the shape reconstruction apparatus exists at the place B. A method of displaying, at the place B, the bright point which is pointed to by the pointer at the place A will be described below. A bright point 52A is projected onto the real object 40 at the place A from a laser pointer 51. The camera 7A at the place A images a surface texture of the real object 40 and the bright point 52A pointed to by the pointer 51 at the same time and transmits them to the place B as the top face and side face texture images of the real object 40. At the place B, the surface texture imaged at the place A and the bright point pointed to by the pointer 51 are projected onto the reconstructed three dimensional shape based on the received texture images. Accordingly, the pointed position at the place A can be recognized as a bright point 52B on the reconstructed shape at the place B.

FIGS. 12A and 12B are drawings to show an example of displaying a bright point pointed to by a pointer in two ways. In this case, the imaging mirrors 8A and 8B are replaced with half mirrors 58A and 58B, and a bright point pointed to by a pointer is imaged and surface texture is projected on a real object and a reconstructed three dimensional shape. First, at the places A and B, the half mirrors 58A and 58B are placed on the cross optical axes of the projectors 5A and 5B and the cameras 7A and 7B. While surface texture is projected onto the real object 40 and the reconstructed three dimensional shape, imaging is executed at the same time. Accordingly, a surface texture image containing the bright point pointed to by the pointer can be acquired at each of the places A and B.

To display at the place B the bright point pointed to by the pointer 51A at the place A, a surface texture image containing the bright point 52A pointed to by the pointer 51A acquired at the place A is transmitted to the place B and is projected onto a three dimensional shape at the place B. Accordingly, the bright point 52A on a real object 40 is reproduced on the three dimensional shape at the place B as a bright point 52B. In contrast, to display at the place A the bright point pointed to by the pointer 51B at the place B, a surface texture image containing the bright point 53B pointed to by the pointer 51B acquired at the place B is transmitted to the place A and is projected onto the real object 40 at the place A. Accordingly, the bright point 53B on the three dimensional shape at the place B is reproduced on the real object 40 at the place A as a bright point 53A.

At this time, if projection and imaging are executed at the same time, inconvenience may occur. This topic will be described with reference to FIG. 13. FIG. 13A shows the case where a real object at the place A is reconstructed at the place B. In this case, a texture image of a reconstructed shape containing the bright point pointed to by the pointer at the place B (texture B+pointer B) is projected onto the real object at the place A and at the same time, a texture image of the real object containing the bright point pointed to by the pointer (texture A+pointer A) is imaged. A texture image of the real object containing the bright point pointed to by the pointer at the place A (texture A+pointer A) is projected onto the reconstructed shape at the place B and at the same time, a texture image of the reconstructed shape containing the bright point pointed to by the pointer (texture B+pointer B) is imaged. FIG. 13B shows the case where a 3D model on 3D-CAD is reconstructed at the two places A and B. In this case, a computer graphics (CG) texture image of the bright point pointed to by the pointer at the place B and a reconstructed shape (CG texture+pointer B) is projected onto the reconstructed shape at the place A and at the same time, a CG texture image of the bright point pointed to by the pointer and a reconstructed shape (CG texture+pointer A) is imaged. Also, a CG texture image of the bright point pointed to by the pointer at the place A and a reconstructed shape (CG texture+pointer A) is projected onto the reconstructed shape at the place B and at the same time, a CG texture image of the bright point pointed to by the pointer and the reconstructed shape (CG texture+pointer B) is imaged. In FIGS. 13A and 13B, the texture image imaged at the place A is projected and is imaged at the place B and further the image is projected and is imaged at the place A, resulting in an infinite loop of the projection and the imaging. Thus, the brightness of the projection image increases, which causes halation.

Then, projection and imaging are separated in a time-division manner and image projection by the projector is not executed during imaging as shown in FIG. 14. FIG. 14A shows the case where a real object at the place A is reconstructed at the place B. In this case, the bright point pointed to by the pointer at the place B (pointer B) is projected onto the real object at the place A, and after the projection ends, a texture image of the real object containing the bright point pointed to by the pointer (texture A+pointer A) is imaged. Then, the texture image of the real object containing the bright point pointed to by the pointer at the place A (texture A+pointer A) is projected at the place B, and after the projection ends, the bright point pointed to by the pointer at the place B (pointer B) is imaged FIG. 14B shows the case where a 3D model on 3D-CAD is reconstructed at two points. In this case, at the place A, a computer graphics (CG) texture image of the bright point pointed to by the pointer at the place B and a reconstructed shape (CG texture+pointer B) is projected onto the reconstructed shape and after the projection ends, the bright point pointed to by the pointer (pointer A) is imaged. At the place B, a CG texture image of the bright point pointed to by the pointer at the place A and a reconstructed shape (CS texture+pointer A) is projected and after the projection ends, the bright point pointed to by the pointer at the place B (pointer B) is imaged. The projection and the imaging are executed alternately at time intervals of one frame (1/30 seconds), for example. In so doing, the projection and the imaging do not make an infinite loop and halation of the projection image is eliminated.

The invention relates to the three dimensional display system and involves industrial applicability.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three dimensional display system comprising:
   a first apparatus placed at a first point comprising:
      a three dimensional shape reconstruction apparatus provided with a three dimensional shape which is controllable to reconstruct a three dimensional shape,
      a reflector that reflects projection light from above the three dimensional shape reconstruction apparatus to side faces of the three dimensional shape reconstruction apparatus,
      a controller that controls the three dimensional shape of the three dimensional shape reconstruction apparatus based on three dimensional shape information, and
      a projector that projects a surface image of the top face of the three dimensional shape onto the top face of the three dimensional shape reconstruction apparatus and that projects surface images of the side faces of the three dimensional shape onto the side faces of the three dimensional shape reconstruction apparatus through the reflector; and
   a second apparatus placed at a second point comprising a transmitter that transmits to the first apparatus the three dimensional shape information and the surface images of the top face and the side faces of the three dimensional shape.

2. The three dimensional display system according to claim 1, wherein:
   the second apparatus further comprises:
      a reflector that reflects projection light from above a real object to the side faces of the real object,
      a projector that projects the projection light, and
      an imager that images the top face of the real object and the side faces of the real object through the reflectors, and
   the second apparatus acquires the three dimensional shape information based on information provided by imaging the projection light projected onto the real object with the imager and acquires the surface images of the top face and the side faces of the three dimensional shape by imaging the top face and the side faces of the real object with the imager.

3. The three dimensional display system according to claim 2, wherein the first apparatus further comprises:
      an imager that images the top face of the three dimensional shape and the side faces of the three dimensional shape through the reflector, and
      a transmitter that transmits the surface images of the top face and the side faces of the three dimensional shape imaged with the imager to the second apparatus.

4. The three dimensional display system according to claim 3, wherein the surface images imaged with the imager of the first apparatus contain a bright point pointed to by a projecting pointer.

5. The three dimensional display system according to claim 3, wherein each of the first apparatus and the second apparatus performs projecting with the projector and imaging with the imager separately in a time-division manner.

6. The three dimensional display system according to claim 2, wherein the surface images imaged with the imager of the second apparatus contain a bright point pointed to by a projecting pointer.

7. The three dimensional display system according to claims 2, wherein the imager includes an imaging mirror or a half mirror that aligns an optical axis and a view angle with the projector.

8. The three dimensional display system according to claim 1, wherein the second apparatus further comprises:
      a three dimensional shape reconstruction apparatus provided with a three dimensional shape and controllable to reconstruct a three dimensional shape,
      a reflector that reflects projection light from above the three dimensional shape reconstruction apparatus to the side faces of the three dimensional shape reconstruction apparatus,
      a controller that controls the three dimensional shape of the three dimensional shape reconstruction apparatus based on three dimensional shape information, and
      a projector that projects a surface image of the top face of the three dimensional shape onto the top face of the three dimensional shape reconstruction apparatus and that projects surface images of the side faces of the three dimensional shape onto the side faces of the three dimensional shape reconstruction apparatus through the reflector.

9. The three dimensional display system according to claim 8, wherein at least one of the first apparatus and the second apparatus includes an imager that images the top face of the three dimensional shape and the side faces of the three dimensional shape through the reflector.

10. The three dimensional display system according to claim 1, wherein the three dimensional shape information and the surface images of the top face and the side faces of the three dimensional shape transmitted by the transmitter of the second apparatus are based on object information created in advance.

11. The three dimensional display system according to 1, wherein the transmitter of the second apparatus transmits to the first apparatus an additional image to be added to the surface images of the top face and the side faces of the three dimensional shape.

12. The three dimensional display system according to claim 11, wherein the additional image is a result image of a computer simulation.

13. The three dimensional display system according to 1, wherein the three dimensional shape reconstruction apparatus has a plurality of pins whose height can be controlled and arranged in a matrix manner, and the height of each of the pins can be controlled by the controller.

14. A three dimensional display comprising:
- a three dimensional shape reconstruction apparatus provided with a three dimensional shape and controllable to reconstruct a three dimensional shape,
- a reflector that reflects projection light from above the three dimensional shape reconstruction apparatus to the side faces of the three dimensional shape reconstruction apparatus,
- a controller that controls the three dimensional shape of the three dimensional shape reconstruction apparatus based on three dimensional shape information, and
- a projector that projects a surface image of the top face of the three dimensional shape onto the top face of the three dimensional shape reconstruction apparatus and that projects surface images of the side faces of the three dimensional shape onto the side faces of the three dimensional shape reconstruction apparatus through the reflector.

15. The three dimensional display according to claim 14, further comprising a transmitter that transmits the surface images of the top face and the side faces of the three dimensional shape imaged with the imager to an external system.

16. The three dimensional display according to claim 14, wherein the imager includes an imaging mirror or a half mirror that aligns an optical axis and a view angle with the projector.

17. A three dimensional display method comprising:
- transmitting three dimensional shape information;
- transmitting surface images of a top face and side faces of the three dimensional shape;
- reconstructing the three dimensional shape using a three dimensional shape reconstruction apparatus provided with a three dimensional shape and controllable to reconstruct a three dimensional shape based on the received three dimensional shape information; and
- projecting the received surface image of the top face of the three dimensional shape onto a top face of the reconstructed three dimensional shape and projecting the received surface images of the side faces of the three dimensional shape onto side faces of the reconstructed three dimensional shape through a reflector.

18. The three dimensional display method according to claim 17, wherein:
- the three dimensional shape information to be transmitted is obtained by measuring a shape of a real object, and
- the surface images of the top face and the side faces of the three dimensional shape to be transmitted are obtained by imaging the real object.

19. The three dimensional display method according to claim 17, wherein the three dimensional shape information and the surface images of the top face and the side faces of the three dimensional shape to be transmitted are based on object information created in advance.

20. The three dimensional display method according to claim 19, further comprising:
- reconstructing the three dimensional shape using the shape reconstruction apparatus based on the object information created in advance; and
- projecting the surface images of the top face and the side faces of the three dimensional shape onto the reconstructed three dimensional shape based on the object information created in advance, at the transmitting side.

* * * * *